United States Patent [19]
Martin

[11] 3,713,102
[45] Jan. 23, 1973

[54] PULSE INTERROGATION ARTICLE-SORTING SYSTEM

[76] Inventor: Stephen J. Martin, 1777 South West 17th Street, Miami, Fla. 33145

[22] Filed: April 23, 1970

[21] Appl. No.: 31,141

[52] U.S. Cl............340/152, 340/149 R, 343/6.5 SS
[51] Int. Cl...............................................H04q 7/00
[58] Field of Search...........340/149 R, 171 R, 258 R; 343/6.5 SS

[56] References Cited

UNITED STATES PATENTS

| | | | |
|---|---|---|---|
| 3,541,995 | 11/1970 | Fathauer | 340/171 R X |
| 3,145,380 | 8/1964 | Currie | 343/6.5 SS |
| 3,500,373 | 3/1970 | Minasy | 340/258 R |
| 3,307,168 | 2/1967 | Zaleski | 340/258 R |
| 2,774,060 | 12/1956 | Thompson | 340/258 R |
| 3,137,847 | 6/1964 | Kleist | 343/6.5 SS |
| 3,264,614 | 8/1966 | Hellström | 343/6.5 SS X |
| 3,299,424 | 1/1967 | Vinding | 343/6.5 SS |
| 3,645,528 | 2/1972 | Cornell | 343/6.5 SS X |

*Primary Examiner*—T. H. Tubbesing
*Attorney*—Joseph B. Gardner

[57] ABSTRACT

A pulse interrogation article-sorting system for identifying and directing articles along a distribution network, such as passenger baggage along a conveyor therefor at an airline terminal. A particular form of the article-sorting system for airline baggage includes a conveyor having both a collection section along which baggage is accumulated and a distribution section providing a plurality of distribution branches or stations respectively corresponding to particular flight destinations and into which articles of baggage are selectively diverted in accordance with the destinations thereof. A plurality of diverters disposed in respective association with the distribution branches are operative selectively to effect diversion thereinto of individual articles of baggage being advanced along the conveyor. Each article of baggage carries a tag equipped with a normally passive identification responder operative to transmit an electromagnetic identification signal representative of the destination indicated by the tag in response to receipt of sharply pulsed electromagnetic interrogation signals emitted by a transmitter for interception by each article of baggage and the responder-equipped tag carried thereby. A receiver having sensor circuitry responsive to the identification signals provides both logic circuitry for processing the signals to identify the same in terms of their destination-distinguishing characteristics and control means connected with the diverters and with the logic circuitry and operative to actuate the diverter corresponding to the particular signal identified by the logic circuitry. Accordingly, whenever the logic circuitry establishes the identity of a particular identification signal transmitted by an identification responder being intercepted by the interrogation signals, the diverter corresponding to that identification signal is actuated to segregate or divert into the appropriate branch the article of baggage carrying such transmitting responder.

11 Claims, 2 Drawing Figures

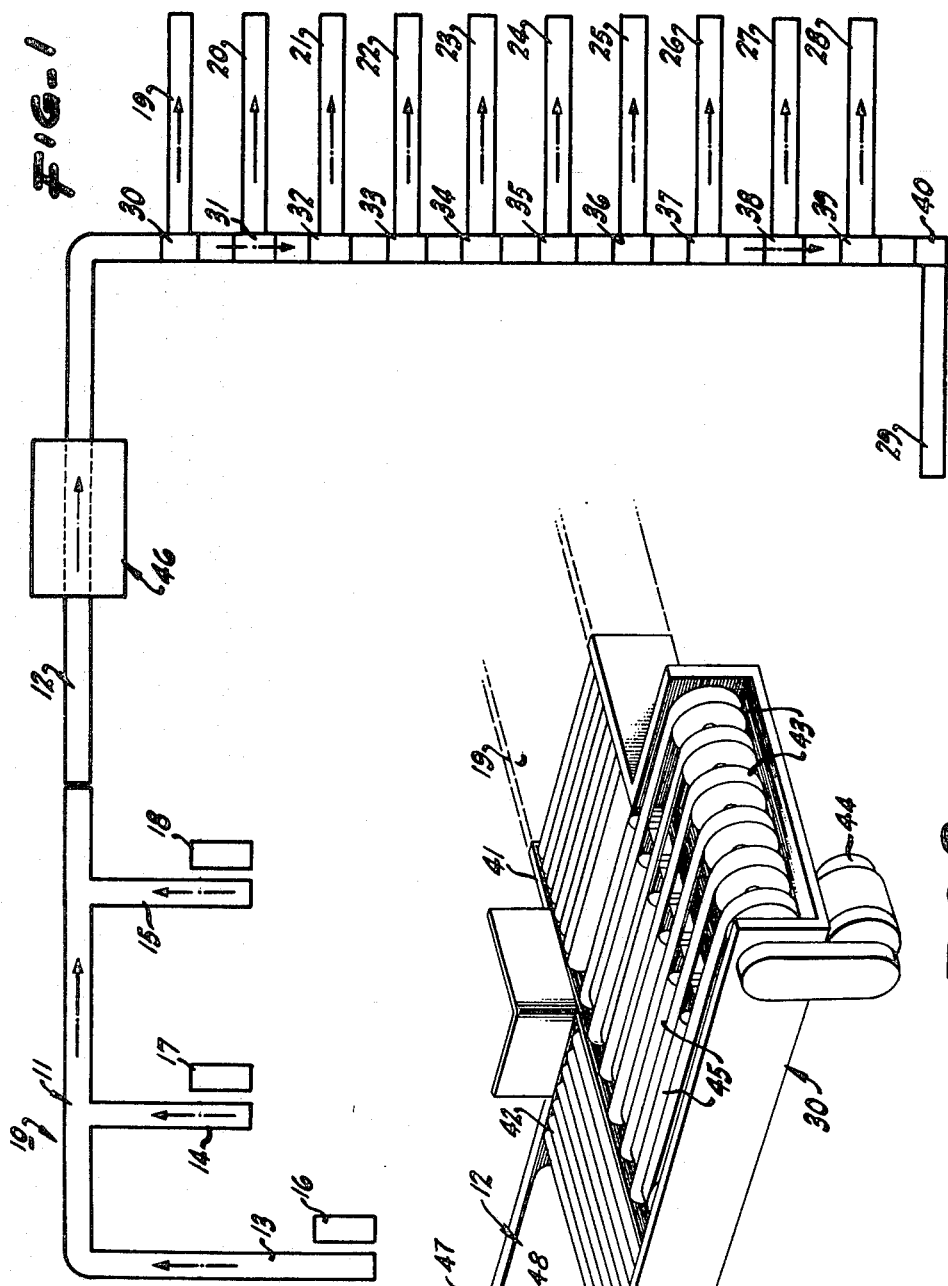

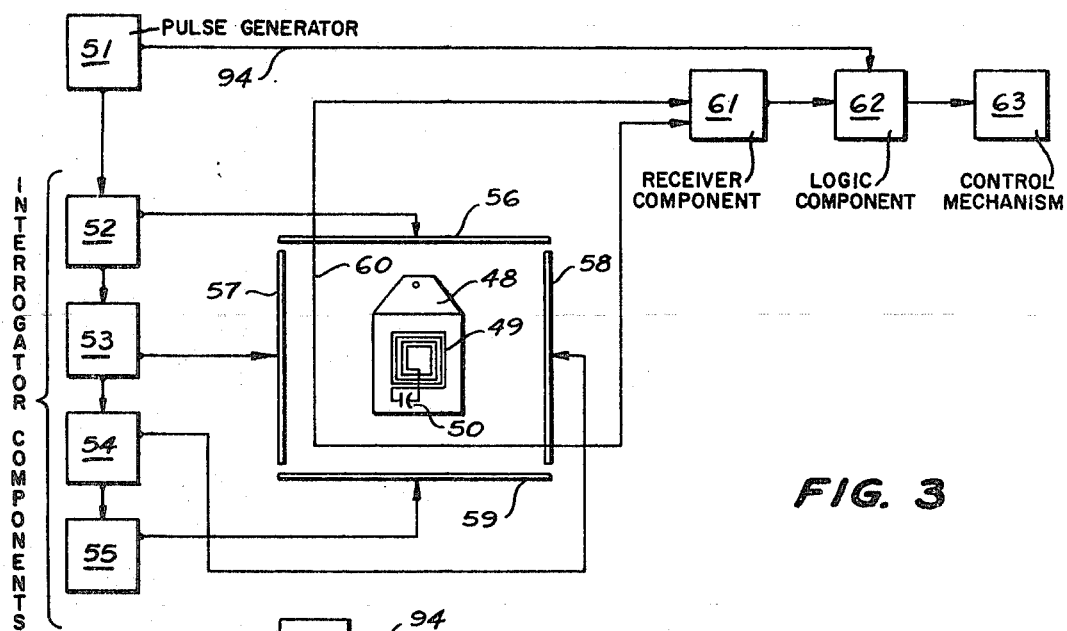
FIG. 3
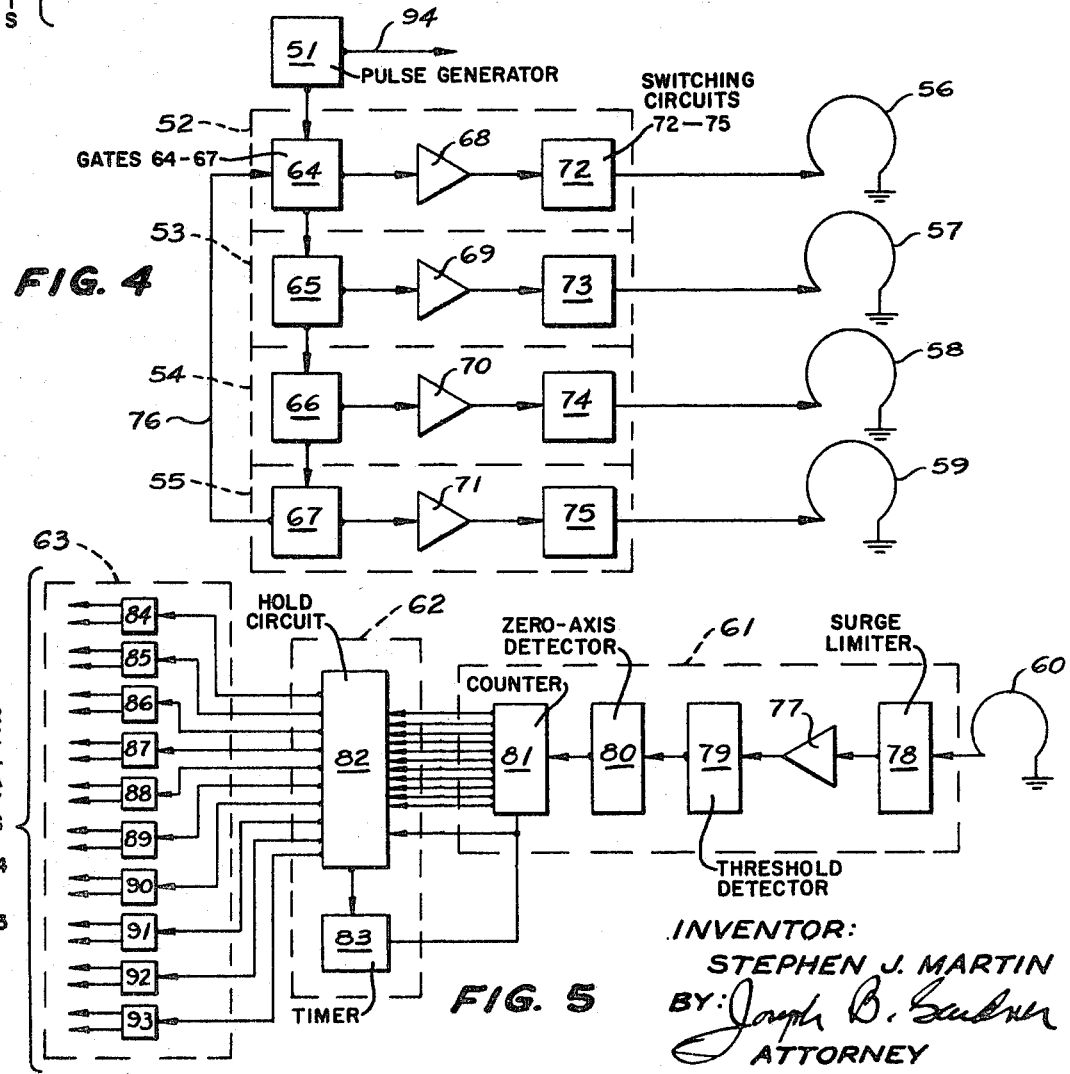
FIG. 4
FIG. 5
INVENTOR:
STEPHEN J. MARTIN
BY: Joseph B. Gardner
ATTORNEY

PULSE INTERROGATION ARTICLE-SORTING SYSTEM

This invention relates to an article-sorting system in which intermingled articles are distributed in accordance with certain predetermined characteristics thereof so as to collect or group those articles having like characteristics. The invention relates more particularly to a system of this type in which the articles themselves by means of self-identification determine and control such distribution and collection thereof. In even greater particularity, the invention relates to a sorting system in which normally passive identification responders are energized by sharply pulsed electromagnetic signals and transmit electromagnetic signals of particular frequencies in response thereto. The system has utility in a variety of environments both industrial and commercial, and a specific example thereof is baggage handling and especially the collection and distribution of passenger baggage at airline terminals.

As explained in the copending patent application of John Charles Turner entitled "Baggage-Handling System," Ser. No. 728,521, filed May 13, 1968, now U.S. Pat. No. 3,520,406, the problems of tagging the baggage of departing passengers, collecting or accumulating the baggage from the various check-in counters, and then routing the baggage to stations from which it is finally placed aboard the proper planes to carry it to its destination are becoming more and more intense because of the increasing number of individual flights and the increasing number of passengers carried by each aircraft — several hundred passengers being accommodated by the latest commercial planes. The same general problems pertain to distribution of the baggage of deplaning passengers, and the present complexities in this respect will be aggravated by the large masses of passengers deplaning concurrently from such newer planes.

The difficulties inherent in the processing of such baggage is more evident when it is appreciated that at present each piece of baggage is completely dormant or inactive, unable to cooperate in reaching its destination (as do airline passengers) except to carry a tag that must be manually inspected at each position along the baggage route at which a change in direction or other selection might be made in routing the baggage toward its destination. Any such change in direction also requires manual attention, and not only does all this requirement for manual intervention and inspection prove costly, but error in misdirection due to human omissions and vagaries occurs at an increasing rate.

In view of the foregoing, it is evident that it would be advantageous to have an improved system for handling baggage at airline terminals, and especially a system in which each individual piece of baggage is able to take an active part in determining the routing therefor necessary to reach its proper destination without the requirement for human intervention; and it is, accordingly, an object of the present invention to provide such an improved system.

Another object of the present invention is in the provision of an improved article-sorting system in which intermingled articles, respectively equipped with self-identifying responders operative to transmit electromagnetic identifying signals each at a frequency corresponding to certain predetermined characteristics of the article associated therewith, are distributed in accordance with such characteristics by means responsive to the signals transmitted thereby.

Still another object is that of providing an improved article-sorting system of the character described in which identification responders respectively carried by the articles to be sorted comprise tuned circuits which are normally completely passive, but can be energized by exposure to sharply pulsed electromagnetic transmissions and then ring at their natural resonant frequencies for a short period of time with each ring or signal consisting of a series of decaying oscillations; the identification signals thus provided by the identification responders being sensed by receiver circuitry and processed for subsequent use in utilization equipment.

A further object of the invention is to provide a system of the type described which operates within a frequency range below that of the usual navigation and communication equipment, that produces substantially no harmonics, that generates and delivers its power requirements into a low resistance circuit having a low power-on to power-off duty cycle, that functions at high speed, that does not require consecutive integration of RF signals to reject noise, and that presents very little hazard to personnel either from electric shock or electromagnetic radiation.

Additional objects and advantages of the invention, especially as concerns particular features and characteristics thereof, will become apparent as the specification continues.

A particular article-handling system embodying the invention includes a conveyor having a collection section along which articles are accumulated in an intermingled manner unrelated to any group-determining characteristics thereof. The conveyor also has a distribution section providing a plurality of distribution branches or stations respectively corresponding to certain characteristics (flight destinations, for example) by which the articles are to be collected or grouped. A plurality of diverters disposed in respective association with the distribution branches are operative selectively to effect diversion into the branches of individual articles being advanced along the conveyors. Each such article is equipped with a self-identifying identification responder which is completely passive until energized by a sharp interrogation pulse at which time it produces an exponentially decaying "ring" or signal of particular frequency.

The interrogation pulse used to energize the identification responders is most advantageously a high powered pulse of short duration and, for example, may have a peak power of the order of 1 kilowatt and a duration of about 2 micro seconds. The identification signals are sorted or identified in terms of their frequencies by measuring the time period of each signal or, more specifically, by measuring the time interval between the zero axis crossings of any one cycle of each signal. Practicably, the time interval between the zero axis crossings of the second or a subsequent cycle of any identification signal is used because the first cycle thereof may be distorted and contain ambiguous or erroneous information.

An embodiment of the invention is illustrated in the accompanying drawings, in which:

FIG. 1 is a diagrammatic view of an article-sorting system embodying the invention;

FIG. 2 is a broken perspective view illustrating one of the diverters of the system;

FIG. 3 is a block diagram illustrating the general electric modules forming a part of the system;

FIG. 4 is a block diagram of the transmitter module; and

FIG. 5 is a block diagram of the receiver and utilization modules.

The particular article-handling or sorting system illustrated in FIG. 1 is intended for use at an airline terminal to process the baggage of departing passengers. As indicated hereinbefore, however, the system has more general utility and, for example, can be used in automatic warehousing articles of various types and in other industrial and commercial processes and procedures. The system shown includes a conveyor 10 comprising a collection section 11 and a distribution section 12. The collection section 11 has a plurality of supply branches 13, 14 and 15 feeding thereinto, and such branch conveyors may be located at quite divergent or separated positions throughout the terminal as, for example, the parking garage thereof, street entrance to the terminal, and each of the ticket counters therewithin. It will be appreciated that any convenient number of branch infeed or supply conveyors can be provided each leading either directly or indirectly to the main line of the collection section 11. As will be brought out more clearly hereinafter, each piece of baggage is tagged before being delivered to the collection section 11 of the conveyor, and tagging stations 16, 17 and 18 are shown in respective association with the branch infeed conveyors 13, 14 and 15.

The distribution section 12 of the conveyor 10 has a plurality of distribution branches or stations located therealong respectively representative of particular characteristics by means of which the articles are to be distributed or grouped. In the case of the baggage-handling system illustrated, the distribution branches represent different flights or trip destinations for the baggage, and from such branches the pieces of baggage grouped or collected therealong will be placed upon proper aircraft for transport thereby to the appropriate destination. In the particular system shown, there are ten such distribution branches respectively denoted with the numerals 19 through 28; and a further branch or collection station 29 at the end of the distribution section 12 is also provided so as to collect as a group baggage which has not been diverted into one of the branches 19 through 28.

A plurality of diverters are disposed along the distribution section 12 in respective association with the branches 19 through 28 so as to selectively divert articles of baggage thereinto. Accordingly, there are 10 such diverters in the particular baggage-handling system illustrated, and they are respectively denoted with the numerals 30 through 39 and are associated with the branches 19 through 28, respectively. A continuously operative diverter or turn section 40 is provided in association with the branch 29 so as to divert thereinto all articles of baggage not diverted into one of the branches 19 through 28.

A typical diverter is illustrated in FIG. 2, and for purposes of specific identification may be taken to be the diverter 30. It should be noted, however, that each of the diverters 30 through 39 may be identical, completely conventional, and it may be any one of a number of selective transfers such as the Automatic Diverter Transfer sold by the Stewart-Galpat Corporation of Zanesville, Ohio. Accordingly, and as shown in FIG. 2, the diverter 30 has a somewhat T-shape with the stem 41 thereof communicating with the distribution branch 19 so as to deliver articles thereto and with the crossbar 42 communicating at each end thereof with the main line of the distribution section 12. The cross bar comprises a plurality of spaced apart conveyor belts 43 continuously driven by a motor and drive train 44 so that the belts 43 travel from left to right along the upper stretches thereof, as viewed in FIG. 2.

Aligned with the stem 41 and defining the junction thereof with the cross bar 42 are a plurality of rollers 45 that are adapted to be positively driven and are alternately disposed between the spaced apart belts 43 and are selectively movable between a lower position in which they are positioned below the belts so as not to interfere with the articles of baggage being advanced thereby, and the elevated position illustrated in FIG. 2 in which they project above the belts 43 and are therefore operative to engage such article of baggage and divert the same from movement along the cross bar 42 and main line of the conveyor section 12 into the stem 41 of the diverter and onto the associated distribution branch 19. The diverter rollers 45 are selectively movable between the lower, retracted and upper, operative positions thereof by mechanism provided for this purpose which is responsive to external command such as provided by a control switch. Since the diverter 30 is conventional, no further details concerning its construction and operation appear necessary.

It may be observed that since there is no particular order to the manner in which baggage is fed to the collection section 11 of the conveyor and, therefore, no assurance of spacing between successive articles being advanced therealong, it is advantageous to provide some minimum spacing between successive articles along the distribution section 12 so as to afford sufficient time for the diverters 30 through 39 to either divert or pass one article and be reconditioned for interception of the next successive article advanced thereto. Such separation between successive articles may be provided by having the distribution section 12 operate at a higher linear velocity than that of the collection section 11; and by way of example, the collection section might have a linear velocity of the order of 100 feet per minute and the distribution section 12 a linear velocity of the order of 200 feet per minute. It will be apparent that the diverters are necessarily operative to accommodate articles at the rate or velocity at which they are advanced by the distribution section 12.

Associated with the conveyor along the distribution section 12 thereof is an article-identification system embodying the present invention and generally denoted in FIG. 1 with the numeral 46. As will be explained in detail hereinafter, the system 46 includes an interrogator operative to produce an interrogation or energizing signal at a particular location along the distribution section 12 of the conveyor so as to be intercepted by the articles of baggage 47 being advanced therealong. Each article of baggage 47 is equipped with an identification responder adapted to produce an article-identifying signal of particular frequency corresponding to the destination of the article, and such responder is most conveniently provided by incorporating the same in a tag 48 exteriorly attached to the article of baggage and which tag also designates by visual identification the destination intended for the article.

The identification responder carried by the tag 48 is a tuned circuit comprising an electric coil 49 and a capacitance 50 connected therewith, as shown in FIG. 3. The natural resonant frequency of the tuned circuit 49, 50 of any tag 48 identifies the destination or other group-identifying characteristics of the tag and, therefore, of the article 47 to which it is attached. The resonant frequency of any particular identification responder is advantageously within the range of about 5 to 250 kilocycles and the frequency separation used to differentiate among the various tags 48 representing different destinations can be several hundred cycles or several thousand cycles depending upon the particular installation and the number of sorts or separations required. In this respect, the frequency separation can be quite small because, as explained in detail hereinafter, the time interval between the zero-axis crossings of any 1 cycle of the identification signal generated by the responder is used to determine the frequency of the signal, and such measurements can be quite acurate.

The article-identification system also includes a receiver which senses the identification signal produced by the responder of any tag 48, and after determining the frequency of the identification signal, transmits the same to logic circuitry which controls operation of the diverters 30 through 39 to cause the same to divert into the respectively associated branch conduits each article of baggage that responds in the appropriate manner to the interrogation signals energizing the same. Thus, a single interrogation signal is used to energize the identification responder of any tag 48 which then produces an identification signal having a particular frequency that distinguishes the same from the signals produced by all of the other tags 48 except for those used to identify the same characteristics and which, therefore, have the same frequency. The identification signal produced by the responder of any tag 48 is received by sensor and logic circuitry operative to identify the particular frequency of such signal and to actuate the proper diverter in response thereto.

The overall electronic components of the system are illustrated in FIG. 3, and they include a transmitter module comprising a pulse generator 51, a plurality of interrogators 52 through 55 (there being four such interrogators in the embodiment of the invention illustrated), and a plurality of signal-transmitting devices 56 through 59 respectively connected with the interrogators 52 through 55; a receiver module comprising a signal receiving device 60 and a sensor component 61; and a utilization module which is divisible for convenience into a logic component 62 and control mechanism 63. The signal transmitting devices 56 through 59 are located at the station 46 along the conveyor 12, and similarly, the signal receiving device 60 is also located at the station 46. Whenever a tag 4 enters the field defined by the transmitting devices 56 through 59 at the station 46, the interrogation responder 49, 50 forming a part of the tag 48 sees or is exposed to one or more interrogation pulses delivered from the pulse generator via the interrogator components 52 through 55 to the signal transmitting devices. In response, the identification responder rings or produces an identification signal at its natural resonant frequency, and such signal is picked up by the device 60 which delivers it to the sensor component 61 which decodes the signal by time or frequency. The output signal from the sensor component is processed in the logic component 62 for conversion into a numerical display and/or into energizing signals for the control mechanism 63.

The pulse generator component 51 is operative to produce sharp pulses which are delivered to the signal transmitting devices 56 through 59 to energize the identification responder of any tag 48 within the field of such signal transmitting devices. The pulse generator 51 may vary considerably in terms of the duration and peak power of each pulse produced thereby, and advantageously the generator should produce pulses at the lowest power level effective to cover the interrogation area defined by the station 46. An interrelationship has been found to exist between the amplitude and duration of an interrogation pulse and the frequency of the identification signal provided by the various responders 49, 50 and, in this respect, the pulse width of an interrogation signal must be sufficiently great that the quantity of energy contained therein is adequate to effect transfer to the tuned circuit of the identification responder that quantity of energy necessary to actuate the same.

A preferred configuration for the pulse generator component 51 is one in which each pulse generated thereby has a width or duration approximating 2 microseconds and a peak power of 1,000 watts or more. This relationship provides an average power of about 2 milliwatts at a pulse repetition rate of 1 pulse per second and approaches the lowest power level at which a 4 foot by 2 foot interrogation area along the conveyor 12 can be covered. If the pulse repetition rate of the generator 51 is increased from 1 to 10 pulses per second, the average power is thereby increased to about 20 milliwatts, and if the pulse repetition rate is increased to about 100 pulses per second, the average power correspondingly becomes 200 milliwatts. Since a pulse having a 2 microsecond duration corresponds to a frequency of 500 kilocycles (i.e., duration or interval is the reciprocal of frequency, so that any one cycle at a frequency of 500 kilocycles has an interval of 2 microseconds), if a one octave separation is provided between the frequencies of the successive identification signals to be used in the sorting system, the optimal available range extends from about 20 kilocycles to about 250 kilocycles, a band which permits hundreds of sorting operations to be performed therewithin.

It has been found that an optimum relationship exists as respects pulse rise frequency ($F_1$) and decay time frequency ($F_2$) to the useable frequency range, and such relationship is that of $$20 \log. (F_1/F_2) 2,$$

or a minimum separation of pulse frequency to operating range of 1 octave. It has also been found that an optimum power density factor has a value not significantly less than $$10 \log. (W_1/W_2) = 1,000 \text{ watts peak},$$

or an average of 2 milliwatts per interrogation pulse per square foot of the conveyor area to be covered by the interrogation signals.

It may be noted that as respects the present invention, any conventional pulse generator circuitry may be used for the component 51 as long as the circuit elements and parameters are selected to provide peak and average power outputs of the character described for interrogation pulses of the type discussed.

As stated hereinbefore, the interrogation pulses developed by the generator 51 are delivered to the signal transmitting devices 56 through 59 via the respectively associated interrogator components 52 through 55. The composition of such interrogator components may vary somewhat depending upon the number and disposition of the devices 56 through 59. In the particular embodiment of the invention being considered, a plurality of signal transmitting devices are used and they take the form of inductance coils. Although a single coil generally encircling the associated interrogation area of the conveyor 12 might be provided, in the usual case a plurality of individual coils will be used. Respecting the coils and orientation thereof, it is desired to prevent sharp signal nulls at the centers of the coils, and this may be accomplished in one of several ways. One technique that may be used advantageously is to employ two crossed loops of one turn each at an angular orientation of 90° relative to each other. Another technique, and the one used in the particular system being considered, is to employ four individual coils, each oriented so as to cover one of the four quadrants of the interrogation area along the conveyor 12 defined by the station 46. The four inductance coils 56 through 59 are energized sequentially, as explained hereinafter.

Each of the inductance coils respectively constituting the signal transmitting devices 56 through 59 is a large coil having a low resistance and, more specifically, it has been found that a coil having one turn and providing a resistance of 0.1 ohm or less is satisfactory. Further, in order to prevent RF radiation from each coil or inductance, no high electric potential should be developed across the open ends of the coil, and if less than 1.2 volts peak is developed across the ends of the coil for each 1,000 watts peak power (i.e., 2 milliwatts average) the inductance coil will not radiate above the 500 micro volts per meter limit set by the Federal Communications Commission for maximum extraneous radiation in industrial systems. It may also be observed that if the coils are oriented so that the interrogation signals or signal field will have an angular disposition with respect to the longitudinal axis of the conveyor 12 (45°, for example), the optimum response by the interrogation responders 49, 50 is obtained.

The interrogator components 52 through 55 interconnecting the pulse generator component 51 with the signal transmitting devices 56 through 59 are substantially identical, and respectively include a gate, pulse-shaping amplifier, and switching circuit. The four gates respectively associated with the interrogators 52 through 55 are denoted with the numerals 64 through 67, the amplifiers are denoted 68 through 71, and the switching circuits are identified as 72 through 75. As is evident in FIG. 4, the gate, amplifier and switching circuit of each interrogator are connected in series with the output signal from the switching circuit being connected with the associated signal-transmitting device. The gates 64 through 67 constitute a ring counter so that the interrogation pulses developed in generator 51 are delivered sequentially to the signal-transmitting devices 56 through 59 so as to provide complete scanning of the entire interrogation area located at the station 46.

The ring counter comprising the gates 64 through 67 may be conventional, and in the form shown is a four-stage counter in which the stage 67 may include a reset pulse generator delivering its output signal to the first stage through a signal line 76 interconnecting the same. Ordinarily, the counter is dormant until a signal pulse is delivered to the gate 64 from the signal generator 51. Such pulse constitutes a triggering signal for the counter, and it initiates the sequential delivery of interrogation pulses to the transmitting devices 56 through 59. The amplifiers 68 through 71 can also be conventional, and they function to sharpen the pulses delivered thereto from the generator 51. The switches 72 through 75 constitute conventional power switching circuits by means of which the aforementioned interrogation pulses having the preferred two-microsecond pulse-width with a peak power approximating 1,000 watts are coupled to the coils or signal-transmitting devices 56 through 59 so as to energize the identification responder 49, 50 within the interrogation station 46.

As indicated hereinbefore, the receiver module includes the signal-receiving device 60 which is located at the interrogation station 46 and may constitute a single electric coil or inductance, as indicated in FIG. 5. It has been found that it is exceedingly advantageous to have the natural resonant frequency of the pick-up coil or receiving device 60 1 octave higher than the highest frequency used as an identification signal — i.e., the highest frequency produced by the identification responder 49, 50 of any tag 48. Further, a coil having 6 turns and a maximum resistance of no more than about 0.8 ohm provides excellent results. A coil 60 having a number of turns greater than six tends to introduce error into the system because it is sometimes energized by extraneous electromagnetic energy.

The identification signal sensed by the device 60 is delivered to a broad-band amplifier 77 through a surge limiter 78 which is essentially a matching device used to limit the magnitude of any pulse delivered to the amplifier 77 to a value sufficiently low to prevent blocking of the receiver stages. By way of example, the element 78 may limit the voltage value of the incoming signal to about ½ volt. The amplified signal constituting the output of the broad-band amplifier 77 is fed to a threshhold detector 79 which, after the threshhold is exceeded, produces a signal output that is delivered to a detector 80. The detector 80 is a zero axis crossing detector which operates to determine when each cycle of the incoming AC signal crosses a zero voltage axis. In this respect, the identification signals developed by the identification responder 49, 50 of any tag 48 is a ringing signal that decays exponentially and, therefore, constitutes a plurality of successive cycles defining a plurality of zero axis crossings which are determined by the detector 80 so as to produce output signals representative thereof whenever the threshhold value is exceeded.

The signal output developed by the detector 80 is fed to a frequency/interval meter 81 which displays a number corresponding to the frequency of the identification signal and feeds such information to a memory unit or logic component of the aforementioned utilization module. The meter 81 may be a standard Eput counter or, if desired, a specially built meter system may be used for opening gates and counting a stable source between two zero axis crossings of any identification signal produced by the detector 80. If a standard Eput meter or interval counter is used, more than one counting position thereof may be used for any numerical digit, thereby allowing any particular tag 48 to have an identification responder that resonates or rings over a broader range of frequencies without causing numerical error. For example, a range of from 40 to 45 kilocycles in which 1/40th thousandth to 1/45th thousandth of a second is assigned to sort the number 5.

The logic component of the utilization module includes high-count-hold circuitry 82 and a hold-count timer 83. The signal output from the meter 81 is fed to the high-count-hold circuitry 82 which effectively displays a single number corresponding to the high count, and the count timer 83 which is actuated by the logic circuitry 82 holds the count number for a short predetermined time period, and then resets the circuitry 82 to zero so as to condition the same for the next count determination. It has been discovered that the signal frequency number (as determined by the meter 81) is always the highest count (or the lowest frequency), and that by using logic circuitry that waits a finite time and then displays the highest count proximity errors are eliminated. The circuitry 82 functions in this manner and may be referred to as a high-count-latch circuit. After the determination is made by the circuitry 82, the count is erased by the timer 83 to prepare the receiver and utilization modules for the incoming identification signal from the next article 47 passing through the interrogation station 46.

It has also been found that a particular relationship exists concerning the holding, wiping and reset time intervals, and such relationship establishes that these time intervals should not be less than 4 times the sorting speed of the system. As the sorting speed of the system is increased, the necessary holding and reset time intervals must be made shorter. By way of example, a relationship found satisfactory for use with a conveyor 12 having an average velocity approximating 240 feet per minute is one in which articles are sorted at about 1/60 of a minute which permits one sort for every 4 feet of conveyor length. It will be recalled that a velocity differential is established between the conveyor sections 11 and 12 so as to effect a predetermined spacing between successive articles 47 advanced by the conveyor section 12 through the interrogation station 46. Thus, the logic components associated therewith may be summarized as constituting a high level threshhold receiver feeding a time interval counter which latches to the highest count number and holds the same for a finite period so as to feed control mechanism and then to reset the logic to zero count preparatory for the next cycle of operation.

The utilization module in addition to the logic components 82,83 includes control or utilization mechanism which in the particular system being considered includes a plurality of relays respectively associated with the diverters 30 through 39 and controlling actuation thereof. As illustrated in FIG. 5, the hold logic circuitry 82 has a plurality of signal outputs respectively corresponding to the number of diverters 30 through 39 located along the conveyor section 12. Accordingly, in the particular system being considered, there are 10 diverters and, therefore, 10 signal outputs from the signal circuitry 82, and these signal outputs are respectively connected to a plurality of relays 84 through 93 that respectively lead to the diverters so as to control actuation thereof. Thus, assuming that the relay 84 is associated with the diverter 30, when a bag 47 which should be diverted into the sorting station 19 passes through the interrogation station 46, the identification signal transmitted by the responder 49,50 forming a part of the tag carried by such article will cause the logic circuitry 82 to actuate the relay 84, whereupon the diverter 30 will be conditioned to sort or divert such bag into the sorting station 19.

The tag 48 is an inexpensive item sufficiently minimal in terms of cost so as to be expendable. Preferably, the tag is a relatively flat sandwich of rectangular configuration with one or more tuned circuits embedded therein and carrying written or printed identification information. The tuned circuit advantageously has a minimum Q of 10 and is resonant over less than about 5 percent of the maximum frequency range when the frequency separation between identification signals is about 10 percent of the range. However, logarithmic separation or semilogarithmic separation of the frequencies of the identification signals can be used to spread the frequency separation between successive signals, thereby increasing the accuracy and reliability of the system.

The tuned circuit in any tag 48 constitutes an inductance and capacitance which may constitute multiple-turn, flat-wound coils and the distributed capacitance thereof, multiple-turn, flat-wound coils with lumped capacitance, printed coils on paper strata in the form of spirals and serpentines with lumped and distributed capacitance, printed coils backed by ferrites, printed coils backed by ferromagnetic foils (steel foil, for example), and analogous arrangements. In the case of printed coils backed by foils, an obscuration ratio of no more than 40 percent of maximum is desired so that the coil does not become shielded and its efficiency decreased.

As indicated hereinbefore, more than one frequency may be used to define or constitute any one identification signal so as to increase the number of counts obtainable for each identification signal. As an example, a tag 48 can be made to respond in multiple frequencies to an interrogation pulse by connecting a plurality of capacitors 50 into different turns of a multiple-turn coil 49 or, alternatively, by including several individual tuned circuits 49,50 each with a different resonant frequency in any one tag 48. All such tuned circuits will respond to the same interrogation pulses, with the result that the responding identification signals can be suitably coded, thereby expanding the number of counts. For example, by binary coding techniques, four frequencies can be made to express any number from 1 to 15, five frequencies can express any number from 1 to 31, etc. In certain installations, teritary or quanternary codes might be employed as well as decimal codes, nano decimal codes, and so forth.

As an example of the way in which the sorting system functions, if the distribution branch 19 is intended to collect articles of baggage thereon having, say, Chicago for a destination, all of the articles of baggage intended for Chicago will carry a tag 48 corresponding to such destination, and such tags will have been placed upon the articles at one of the stations 16 through 18 in the usual manner. The tags 48 will, therefore, contain an identification responder 49,50 operative when energized by a sharp interrogation pulse to produce a decaying identification signal of perhaps 50 kilocycles. When each Chicago-bound article 47 is advanced by the distribution section 12 of the conveyor into the range of the energizing signal produced by the generator 51, the identification responder 49,50 is energized and produces an electromagnetic article-identifying signal having a frequency of 50 kilocycles. Such identification signal will be picked up by the receiver device 60, and amplified and detected in the associated sensor, and processed in the logic module 82,83 so as to actuate the relay 84 connected therewith. As a consequence, the diverter 30 will be actuated so as to cause the baggage article 47 to be shunted into the branch 19 which is intended to receive all Chicago-bound articles.

The distribution branch 29 and continuously operative diverter or turn unit 40 associated therewith are provided to collect any articles of baggage that may fail to carry a suitable baggage tag, that for some reason might fail to be sensed properly, which might be intended for flights leaving at some future date, etc., and must be manually inspected and directed to the appropriate locations therefor.

The system disclosed embodies the ideal characteristic of employing a passive identification responder which is dormant until interrogated or energized by being subjected to a sharply pulsed interrogation or energizing signal. The system has the advantages of low cost, good definition and does not interfere with nor is it sensitive to interference from radio frequency electronic devices used in prevalence especially around an airline terminal. The system also requires no particular orientation of the articles and the responder-equipped tags associated therewith.

The described baggage-handling system requires the use of no carts or other carriers for the individual pieces of baggage because no special orientation of the articles is required in order to be sensed by the appropriate interrogation units. The system lends itself to passenger tagging of the baggage since it is only necessary to select a tag for the proper destination and attach it to the article of baggage in any manner since, as stated, precise positioning of the article of baggage or the tag thereon is not essential. In a physical sense, the distribution section 12 could extend along a tunnel or passageway underlying the walkways from the main terminal building to the various loading stations, and the distribution branches could extend directly to the service area associated with the loading stations. All of the conveyor mechanisms may be completely conventional and can be of the type now in use to transport baggage from one location to another at an airline terminal. In such event, the conveyor mechanisms ordinarily will comprise endless belts which are more suitable to handling odd-shaped pieces of baggage than are roller-type conveyors.

The system is applicable to the handling and distribution of articles and materials generally as well as for processing baggage at airline terminals and, for example, the distribution of parts and components in various manufacturing plants (an automobile assembly line, for example) is another typical use. In any event, the particular articles being processed are self-identifying, and therefore take an active part in selecting the routes leading to their appropriate destinations, and accomplish such selection wholly without human intervention. It will be appreciated that in a system such as shown in FIG. 1 in which the interrogator station 46 is at a location remote from the diverters 30 through 39, the control means comprising the relays 84 through 93 must include an arrangement for delaying the movement of each article into the diverter area of the conveyor until the immediately preceding article has cleared the same, or include some other analogous arrangement to prevent interference or confusion between successive articles such as interlocking switch controls, sequencing switches, etc.

As seen in FIG. 3, operation of the logic component 62 is synchronized with the transmitter module by means of a synchronizing signal delivered to it from the pulse generator component 51 over a signal line 94. Such synchronization of the logic module inhibits operation thereof whenever the pulse generator component 51 is delivering an interrogation pulse. The high-count-hold circuit 82 may be a conventional counting circuit essentially comprising a plurality of and-gates tabulating the counts delivered thereto from the meter 81 so as to determine the highest count and display a number representative thereof, if this is desired, and energize the appropriate relay 84 through 93 so as to actuate the proper diverter 30 through 39 and thereby direct the article of baggage 47 into the appropriate collection station.

As indicated hereinbefore, the system is very fast and can respond theoretically to any 1 cycle of the oscillatory identification signal produced by the responder 49,50 of any tag 48 and which time is ordinarily less than 1/10 of a millisecond. The system has a low power-on to power-off duty cycle, and the energizing power developed in the transmitter module is delivered into the low resistance circuitry defined by any inductance or signal-transmitting device 56 through 59, which is a considerable safety factor. A single transmitter module and single receiver module are adequate for the system since all of the identification responders 49,50 are energized or respond to the same constant frequency interrogation pulses developed by the pulse generator component 51.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. An article-identification system, comprising an interrogator operative to produce at a particular location through which such article passes a succession of sharply pulsed interrogation signals each having essentially the same frequency, a normally dormant identification responder for transport in association with such article through said location and including a tuned circuit having a predetermined resonant frequency different from that of such interrogation signal but responsive thereto so as to be energized thereby and produce an article-identifying signal having predetermined frequency characteristics corresponding to such resonant frequency, a sensor receptive to such identification signal and operative to establish such frequency characteristics thereof, and utilization means connected with said sensor for evidencing as a function of such established frequency characteristics the presence of said identification responder and associated article at such location, whereby a plurality of such articles respectively equipped with normally dormant identification responders having tuned circuits providing differing resonant frequencies all responsive to the same interrogation signals can be differentiated one from another.

2. The system of claim 1 in which said pulse generator produces interrogation signals having a pulse width of the order of 2 microseconds.

3. The system of claim 1 in which said interrogator further includes an inductance connected with said pulse generator and defining a signal-transmitting device positioned adjacent said particular location to transmit interrogation signal thereat, and in which said signal-transmitting device is tuned to the frequency of the interrogation signals produced by said pulse generator.

4. The system of claim 3 in which said inductance is a relatively large coil of low resistance.

5. The system of claim 4 in which said inductance comprises 1 turn and has a resistance of about 0.1 ohm.

6. The system of claim 3 in which said interrogator is operative to limit the voltage present across said inductance to a relatively low value and thereby limit the electric components in the signal field developed by said inductance to low values so as to minimize electromagnetic radiation therefrom.

7. The system of claim 3 in which said interrogator developes a power ratio per identification signal pulse of at least about 2 milliwatts average power per square foot of area at said predetermined location through which such article may pass.

8. The system of claim 1 in which said sensor includes a zero axis crossing detector so as to establish the frequency characteristics of any such identification signal by determining the zero axis crossings of any 1 cycle thereof.

9. The system of claim 8 in which said sensor further includes a broad-band amplifier interposed between said receiver inductance and zero axis crossing detector, and a threshhold detector coupling said broadband amplifier and zero axis crossing detector.

10. The system of claim 9 in which said sensor further includes an interval counter for measuring the interval between the zero axis crossings determined by said zero axis crossing detector.

11. The system of claim 1 in which said utilization means includes a logic component operative to establish the count number within a finite time period representing such frequency characteristics, and in which said logic component includes a high-count-hold logic circuit and a hold-count timer connected therewith.

* * * * *